United States Patent [19]

Ozaki

[11] Patent Number: 5,303,178
[45] Date of Patent: Apr. 12, 1994

[54] MULTIPLYING SYSTEM BASED ON THE BOOTH'S ALGORITHM AND GENERATING A POSITIVE OR NEGATIVE PRODUCT IN RESPONSE TO A MODE SIGNAL

[75] Inventor: Yasushi Ozaki, Tokyo, Japan
[73] Assignee: NEC Corporation, Tokyo, Japan
[21] Appl. No.: 830,400
[22] Filed: Jan. 31, 1992

[30] Foreign Application Priority Data

Jan. 31, 1991 [JP] Japan .................. 3-032444

[51] Int. Cl.$^5$ .................................. G06F 7/52
[52] U.S. Cl. .................................. 364/760
[58] Field of Search .............. 364/715.01, 736, 748, 364/754, 757, 760

[56] References Cited

U.S. PATENT DOCUMENTS

| | | | |
|---|---|---|---|
| 4,594,678 | 6/1986 | Uhlenhoff | 364/736 |
| 4,813,008 | 3/1989 | Shigehara et al. | 364/760 |
| 4,969,118 | 11/1990 | Montoye et al. | 364/748 |

Primary Examiner—Long T. Nguyen
Assistant Examiner—C. Ngo
Attorney, Agent, or Firm—Whitham & Marhoefer

[57] ABSTRACT

A multiplying system based on the Booth's algorithm, comprises a Booth's decoder having a first input receiving a multiplier "Y" and a second input receiving a mode signal designating either a first multiplication of "X×Y" (where "X" is a multiplicand) or a second multiplication of "−X×Y". The Booth's decoder generates a Booth's decoded value and a sign selection signal to a partial product generation circuit which also receives the multiplicand "X", so that the partial product generation circuit generates either a first partial product of "X×Y" or a second partial product of "−X×Y" in accordance with the sign selection signal. An output of the partial product generation circuit is summed by a partial product summing circuit, and an output of the partial product summing circuit is added to a value "A" stored in an output register by an arithmetic unit. Thus, the accumulating multiplication "A=A±X×Y" can be executed in the same hardware without using a circuit for sign-inverting the output of the partial product summing circuit.

1 Claim, 2 Drawing Sheets

MULTIPLYING SYSTEM BASED ON THE BOOTH'S ALGORITHM AND GENERATING A POSITIVE OR NEGATIVE PRODUCT IN RESPONSE TO A MODE SIGNAL

BACKGROUND OF THE INVENTION

1. Field of the Invention

The present invention relates to a multiplying system, and more specifically to a multiplying system for preforming an accumulating multiplication expressed by "$A = A \pm X \times Y$" where "A", "X" and "Y" are in the form of two's complement.

2. Description of Related Art

Conventionally, when the accumulating multiplication "$A = A \pm X \times Y$" where "A", "X" and "Y" are in the form of two's complement) is performed, a multiplication of "$P = X \times Y$" is first executed. For this purpose, the multiplier "Y" is supplied to a Booth's decoder, and an output of the Booth's decoder is supplied together with the multiplicand "X" to a partial product generation circuit, so that a partial product is generated. The generated partial product is summed in a partial product summing circuit, so that "P" ($= X \times Y$) is obtained. Thereafter, the calculation of "$A \pm P$" is performed using an arithmetic unit. For this purpose, an output of the partial product summing circuit is connected directly to one input of a selector and also through a sign inverting circuit to the other input of the selector. An output of the selector is connected to one input of the arithmetic unit, which in turn has its other input connected to a register holding the value "A". Thus, when the calculation of "$A - P$" is performed, the selector supplies an output of the sign inverting circuit to the arithmetic unit, and when the calculation of "$A + P$" is performed, the selector supplies the output of the partial product summing circuit to the arithmetic unit.

In the above mentioned multiplying system, when the accumulating multiplication "$A = A - X \times Y$" is to be executed, a circuit for inverting the sign of the result of multiplication between "X" and "Y" is required. Therefore, the amount of required hardware is increased, and in addition, the operation speed drops.

SUMMARY OF THE INVENTION

Accordingly, it is an object of the present invention to provide a multiplying system which has overcome the above mentioned defect of the conventional one.

Another object of the present invention is to provide a multiplying system which requires no circuit for inverting the sign of the result of multiplication, and which has a simple construction and can execute an arithmetic operation at a high speed.

The above and other objects of the present invention are achieved in accordance with the present invention by a multiplying system based on the Booth's algorithm, comprising a Booth's decoder having a first input receiving a multiplier "Y" and a second input receiving a mode signal designating either a first multiplication of "$X \times Y$" (where "X" is a multiplicand) or a second multiplication of "$-X \times Y$", the Booth's decoder generating a first output indicative of an absolute value of s Booth's decoded value and a second output indicative of an exclusive-OR between the mode signal and a sign signal representative of a positive/negative of the Booth's decoded value.

With the above mentioned arrangement, the mode signal designating "$A = A + X \times Y$" or "$A = A - X \times Y$" is supplied together with the multiplier "Y" to the Booth's decoder, so that the multiplier "Y" is decoded by using the mode signal as a selection signal for the multiplier "Y". Therefore, no circuit for inverting the sign of the result of multiplication is required.

The above and other objects, features and advantages of the present invention will be apparent from the following description of preferred embodiments of the invention with reference to the accompanying drawings.

DESCRIPTION OF THE PREFERRED EMBODIMENTS

Figure 1:
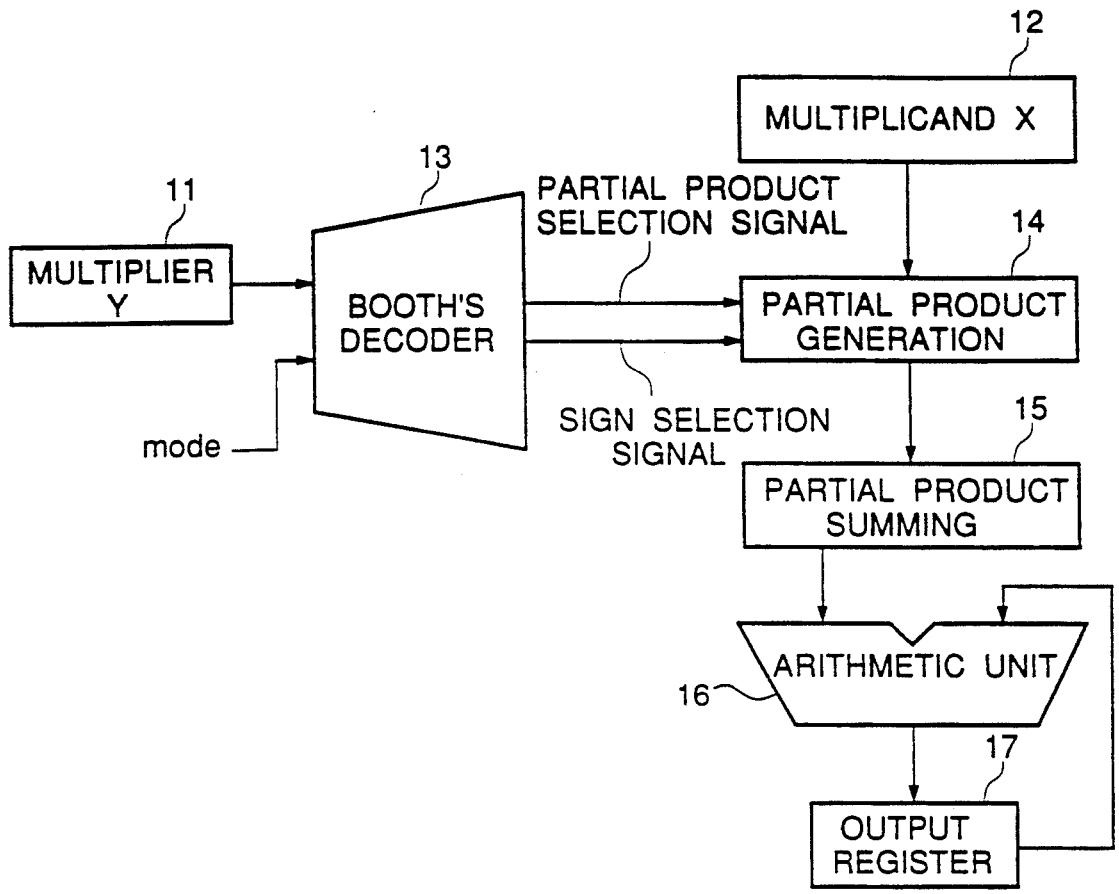
FIG. 1 is a block diagram of an embodiment of the multiplying system in accordance with the present invention.

Referring to FIG. 1, there is shown a block diagram of an embodiment of the multiplying system in accordance with the present invention.

A multiplier register 11 for holding a multiplier "Y" is connected to a second order Booth's decoder 13 so as to supply the held multiplier "Y" to the Booth's decoder 13. This Booth's decoder 13 also receives a mode signal "mode". The Booth's decoder 13 outputs a partial product selection signal and a sign selection signal to a partial product generation circuit 14, which is also connected to a multiplicand register 12 so as to receive a multiplicand "X". A partial product generated by the partial product generation circuit 14 is supplied to a partial product summing circuit 15. An output of the partial product summing circuit 15 is connected directly to one input of an arithmetic unit 16, which in turn has its other input connected to an output register 17 holding a given value "A".

In the case of multiplying two numbers expressed in the form of two's complement, the multiplier "Y" is expressed by the following equation (2), by using the second order Booth's algorithm expressed by the following equation (1):

$$E_j = -2y_{2j+1} + y_{2j} + y_{2j-1} \tag{1}$$

$$\begin{aligned} Y &= -y_{n-1} + \sum_{j=0}^{n-1} y_j \cdot 2^j \\ &= \sum_{j=0}^{(n-1)/2} E_j \cdot 2^{2j} \end{aligned} \tag{2}$$

where "n" is an odd number not less than 3.

Here, assuming that "$P_1 = X \times Y$" and "$P_2 = -X \times Y$", "$P_1$" and "$P_2$" are expressed by the following equations (3) and (4)

$$P_1 = X \cdot \sum_{j=0}^{(n-1)/2} E_j \cdot 2^{2j} \tag{3}$$

-continued $$P_2 = -X \cdot \sum_{j=0}^{(n-1)/2} E_j \cdot 2^{2j} \quad (4)$$

$$= X \cdot \sum_{j=0}^{(n-1)/2} (-E_j) \cdot 2^{2j}$$

Accordingly, when "$P_1$" should be obtained, it is sufficient if the second order Booth's decoder 13 decodes "$E_j$", and when "$P_2$" should be obtained, it is sufficient if the second order Booth's decoder 13 decodes "$-E_j$".

Figure 2:
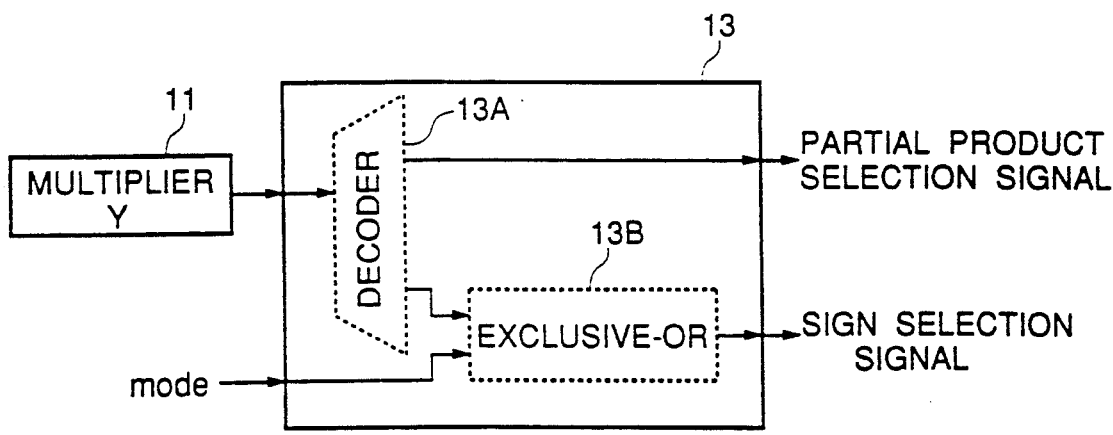
FIG. 2 is a block diagram illustrating a structure of the Booth's decoder used in the multiplying system shown in FIG. 1.

Here, referring to FIG. 2, there is shown a block diagram illustrating a structure of the second order Booth's decoder used in the multiplying system shown in FIG. 1. The second order Booth's decoder includes a second order Booth's decoding circuit 13A receiving the multiplier "Y" and generating the partial product selection signal and a sign signal indicating a positive/-negative sign of "$E_j$". This sign signal is connected to one input of an exclusive-OR circuit 13B, which has its other input connected to receive the mode signal indicating which of the multiplications "X×Y" and "−X×Y" should be executed. Therefore, an output of the exclusive-OR circuit 13B indicates a sign of the partial product when "$P_1$" and "$P_2$" are calculated in the same hardware.

The decoder 13 is configured in accordance with the equation (1), and input/output values of the decoder 13 can be expressed by the following truth table:

| INPUT | | | | OUTPUT | | | | |
|---|---|---|---|---|---|---|---|---|
| mode | $y_{2j-1}$ | $y_{2j}$ | $y_{2j+1}$ | 2x | x | zero | plus | minus |
| 0 | 0 | 0 | 0 | 0 | 1 | 1 | 1 | 0 |
| 0 | 0 | 0 | 1 | 1 | 0 | 0 | 0 | 1 |
| 0 | 0 | 1 | 0 | 0 | 1 | 0 | 1 | 0 |
| 0 | 0 | 1 | 1 | 0 | 1 | 0 | 0 | 1 |
| 0 | 1 | 0 | 0 | 0 | 1 | 0 | 1 | 0 |
| 0 | 1 | 0 | 1 | 0 | 1 | 0 | 0 | 1 |
| 0 | 1 | 1 | 0 | 1 | 0 | 0 | 1 | 0 |
| 0 | 1 | 1 | 1 | 0 | 1 | 1 | 1 | 0 |
| 1 | 0 | 0 | 0 | 0 | 1 | 1 | 1 | 0 |
| 1 | 0 | 0 | 1 | 1 | 0 | 0 | 1 | 0 |
| 1 | 0 | 1 | 0 | 0 | 1 | 0 | 0 | 1 |
| 1 | 0 | 1 | 1 | 0 | 1 | 0 | 1 | 0 |
| 1 | 1 | 0 | 0 | 0 | 1 | 0 | 0 | 1 |
| 1 | 1 | 0 | 1 | 0 | 1 | 0 | 1 | 0 |
| 1 | 1 | 1 | 0 | 1 | 0 | 0 | 0 | 1 |
| 1 | 1 | 1 | 1 | 0 | 1 | 1 | 1 | 0 |

In the above truth table, input values $Y_{2j-1}$, $Y_{2j}$, and $Y_{2j+1}$ are indicative of three continuous bits of the multiplier "Y". The mode signal "mode" assumes "1" in the case of the multiplication "X×Y" and "0" in the case of the multiplication "−X×Y". On the other hand, the decoder 13 has three selection signals "2x", "x" and "zero" indicating a double of the multiplicand "X", the multiplicand "X" and zero, respectively. These selection signals are selectively activated so as to cause the partial product generation circuit to select any one or ones of "2X", "X" and zero. In addition, the decoder 13 has a plus signal "plus" and a minus signal "minus", which are alternatively activated so as to indicate the sign of the selected output "2X" or "X".

For example, when the value of "$E_j$" in the equation (1) is −2, and the mode signal is "0", the decoded values outputted from the decoder is expressed as follows:

$$(2x, x, \text{zero}, \text{plus}, \text{minus}) = (1, 0, 0, 0, 1) \quad (5).$$

Accordingly, the decoder 13 outputs the selection and sign signals in accordance with the truth table mentioned above, and the partial product generation circuit is controlled by the selection and sign signals supplied from the decoder 13 so as to generate a partial product. Thus, "(n+1)/2" partial products are summed or totalized in the partial product summing circuit 15, and the result of summing is added with the value of the output register 17 by the arithmetic unit 16. The result of the arithmetic operation is outputted to the register 17. Thus, the accumulating multiplication can be realized with no circuit for generating the sign-inverted data.

Figure 3:
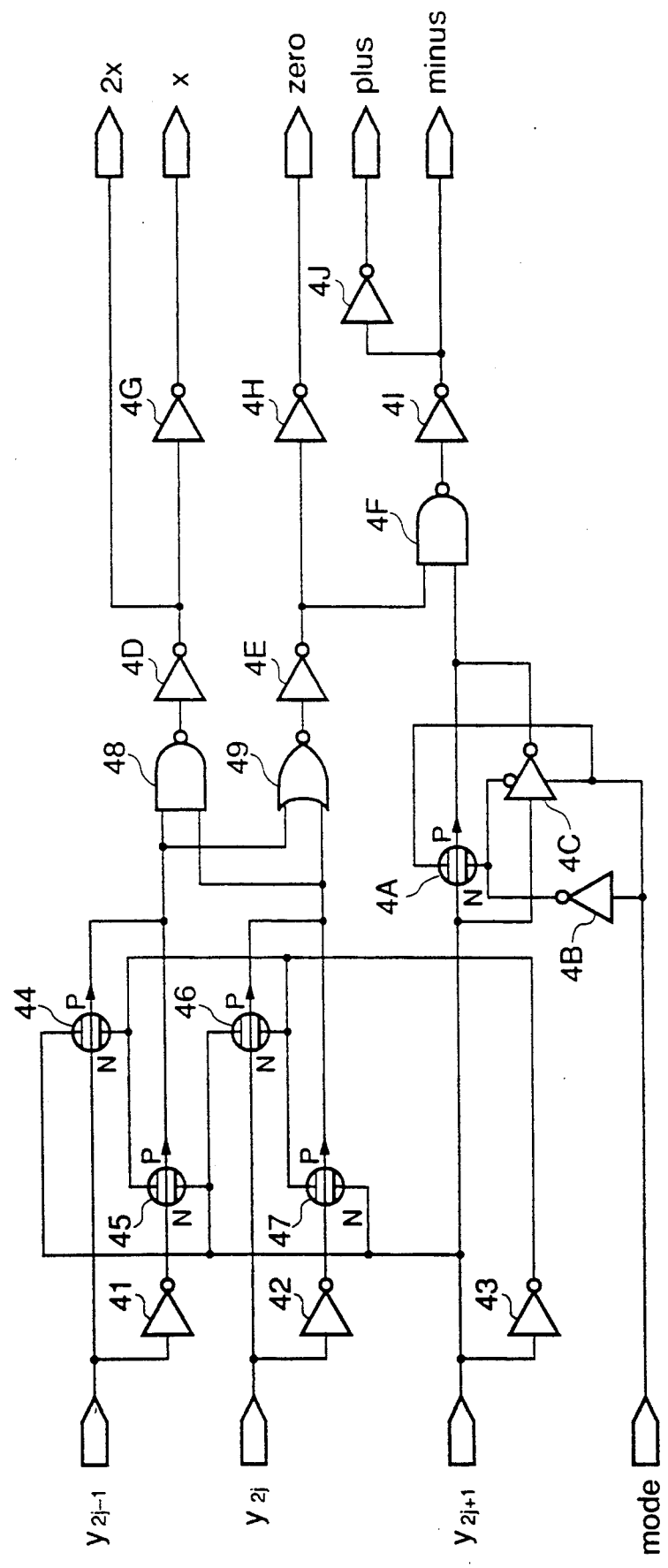
FIG. 3 is logic circuit diagram illustrating another structure of the Booth's decoder used in the multiplying system shown in FIG. 1.

Referring to FIG. 3, there is shown a logic circuit diagram of another embodiment of the decoder 13. The shown logic circuit diagram illustrates one of "(n+1)/2" decoders which cooperate to constitute the second order Booth's decoder used in the multiplying system shown in FIG. 1.

The shown decoder includes inverters 41 to 43, 4B, 4D, 4E and 4G to 4J, transfer gates 44 to 47 and 4A, two-input NAND gates 48 and 4F, a two-input NOR gate 49 and a clocked inverter or tristate inverter 4C, which are connected as shown in FIG. 3.

More specifically, the NAND gate 48 has a first input connected to receive the input signal $y_{2j-1}$ through the transfer gate 44 and also to receive the same input signal $y_{2j-1}$ through the transfer gate 45 and an inverter 41. A second input of the NAND gate 48 is connected to receive the input signal $y_{2j}$ through the transfer gate 46 and also to receive the same input signal $y_{2j}$ through the transfer gate 47 and an inverter 42. A p-channel transistor of each of the transfer gates 44 and 46 and an n-channel transistor of each of the transfer gates 45 and 47 have their gate connected to receive directly the input signal $y_{2j+1}$, and an n-channel transistor of each of the transfer gates 44 and 46 and a p-channel transistor of each of the transfer gates 45 and 47 have their gate connected to an output of an inverter 43 receiving the input signal $y_{2j+1}$. Therefore, when the input signal $y_{2j+1}$ assumes the logic value "0", the transfer gates 44 and 46 are put in a signal propagating condition and the transfer gates 45 and 47 are put in a signal blocking condition. When the input signal $y_{2j+1}$ assumes the logic value "1", the transfer gates 44 and 46 are put in the signal blocking condition and the transfer gates 45 and 47 are put in the signal propagating condition.

The inverter 4D has an input connected to an output of the NAND gate 48 and an output generating the output signal "2x". The inverter 4G has an input connected to an output of the inverter 4D and an output generating the output signal "x". The NOR gate 49 has a pair of inputs connected to the first and second inputs of the NAND gate 48, respectively. The inverter 4E has an input connected to an output of the NOR gate 49, and the inverter 4H has an input connected to an output of the inverter 4E and an output generating the output signal "zero".

The NAND gate 4F has a first input connected to the output of the inverter 4E and a second input connected to receive the input signal $y_{2j+1}$ through the transfer gate 4A and also to receive the same input signal $y_{2j+1}$ through the tristate inverter 4C. A gate of a p-channel transistor of the transfer gate 4A and a non-inverting control terminal of the tristate inverter 4C are connected to receive the mode signal, and a gate of an n-channel transistor of the transfer gate and an inverting control terminal of the tristate inverter 4C are connected to an output of the inverter 4B which receives the mode signal at its input. When the mode signal has the logic level "0", the transfer gate 4A is put in the signal propagating condition and the tristate inverter 4C is put in a high impedance, and when the mode signal has the logic level "1", the transfer gate 4A is put in the signal blocking condition and the tristate inverter 4C operates as an inverter. The inverter 4I has an input connected to an output of the NAND gate 4F and an output generating the output signal "minus". The inverter 4J has an input connected to an output of the inverter 4I and an output generating the output signal "plus".

As mentioned hereinbefore, input values $y_{2j-1}$, $y_{2j}$, and $y_{2j+1}$ are three continuous bits of the multiplier "Y". The mode signal selects either one of the multiplication "X×Y" and the multiplication "−X×Y". Outputs "2x", "x" and "zero" indicate which of partial products "±2X", "±X" and "0" (zero) should be selected. These outputs "2x", "x" and "zero" and other outputs "plus" and "minus" are in accordance with the truth table mentioned hereinbefore.

For example, when the logic value of $y_{2j+1}$ is "1" and the logic value of $y_{2j}$ and $y_{2j-1}$ are "0", and when the logic value of the mode signal is "0", $y_{2j}$ and $y_{2j-1}$ are propagated through the transfer gates 45 and 47 to the NAND gate 48 since $y_{2j+1}$ is of the logic value "1". Namely, since both inputs of the two-input NAND gate 48 are "1", the inverter 4D outputs the logic value "1". Accordingly, the output "2x" becomes the logic level "1", and the output "x" becomes the logic level "0". In addition, since both inputs of the NOR gate 49 are "1", the NOR gate 49 outputs the logic value "0". Accordingly, the output "zero" becomes the logic level "0".

On the other hand, since the mode signal is of the logic value "0", $y_{2j+1}$ is propagated through the transfer gate 4A. Therefore, since both inputs of the NAND gate 4F are "1", the NAND gate 4F outputs the logic value "0". Accordingly, the output "plus" becomes the logic level "0", and the output "minus" becomes the logic level "1".

In response to any combination of input logic values, the decoder shown in FIG. 3 generates the five output logic value signals in accordance with the truth table shown hereinbefore. In other words, the relation between the input logic values and the input logic values of the decoder is completely consistent with the truth table shown hereinbefore.

Therefore, the equation (1) of the second order Booth's algorithm and $(-E_j)$ can be decoded in accordance with the mode signal. Accordingly, an effect similar to that obtained in the first embodiment can be obtained.

In the above mentioned embodiment, the second order Booth's decoder is used. But, a similar effect can be obtained by using a third or further higher order Booth's decoder.

The invention has thus been shown and described with reference to the specific embodiments. However, it should be noted that the present invention is in no way limited to the details of the illustrated structures but changes and modifications may be made within the scope of the appended claims.

I claim:

1. A multiplying system based on the Booth's algorithm, comprising:
   a second order Booth's decoder having a first input receiving a multiplier "Y" and a second input receiving a mode signal designating either a first multiplication of "X×Y" (where "X" is a multiplicand and "Y" is a multiplier) or a second multiplication of "−X×Y", said second order Booth's decoder being configured to fulfill the following input/output relation:

| INPUT | | | OUTPUT | | | | |
|---|---|---|---|---|---|---|---|
| mode | $y_{2j+1}$ | $y_{2j}$ | $y_{2j-1}$ | 2x | x | zero | plus | minus |
| 0 | 0 | 0 | 0 | 0 | 1 | 1 | 1 | 0 |
| 0 | 0 | 0 | 1 | 1 | 0 | 0 | 0 | 1 |
| 0 | 0 | 1 | 0 | 0 | 1 | 0 | 1 | 0 |
| 0 | 0 | 1 | 1 | 0 | 1 | 0 | 0 | 1 |
| 0 | 1 | 0 | 0 | 0 | 1 | 0 | 1 | 0 |
| 0 | 1 | 0 | 1 | 0 | 1 | 0 | 0 | 1 |
| 0 | 1 | 1 | 0 | 1 | 0 | 0 | 1 | 0 |
| 0 | 1 | 1 | 1 | 0 | 1 | 1 | 1 | 0 |
| 1 | 0 | 0 | 0 | 0 | 1 | 1 | 1 | 0 |
| 1 | 0 | 0 | 1 | 1 | 0 | 0 | 1 | 0 |
| 1 | 0 | 1 | 0 | 0 | 1 | 0 | 0 | 1 |
| 1 | 0 | 1 | 1 | 0 | 1 | 0 | 1 | 0 |
| 1 | 1 | 0 | 0 | 0 | 1 | 0 | 0 | 1 |
| 1 | 1 | 0 | 1 | 0 | 1 | 0 | 1 | 0 |
| 1 | 1 | 1 | 0 | 1 | 0 | 0 | 0 | 1 |
| 1 | 1 | 1 | 1 | 0 | 1 | 1 | 1 | 0 | where input values $y_{2j-1}$, $y_{2j}$, and $y_{2j+1}$ are indicative of three continuous bits of said multiplier "Y", "mode" is indicative of a mode signal, "2x", "x" and "zero" indicates twice the multiplicand "X", the multiplicand "X" and zero, respectively, "plus" and "minus" indicate a sign of an output selected in by said signal "2x" or "x";

a partial product generation circuit receiving the multiplicand "X" and said signals "2x", "x", "zero", "plus" and "minus" outputted from said decoder, for generating either a first partial product of "X×Y" or a second partial product "−X×Y" in accordance with said sign selection signals "plus" and "minus";

a partial product summing circuit receiving an output of said partial product generation circuit;

an output register for holding a given value "A"; and an arithmetic unit receiving an output of said partial product summing circuit and said given value "A" for writing the result of an accumulating multiplication A=A+X×Y or A=A−X×Y into said output register;

wherein said Booth's decoder includes:

a first NAND gate having a first input connected to receive said input signal $y_{2j-1}$ through a first transfer gate and also to receive the same input signal $y_{2j-1}$ through a second transfer gate and a first inverter, a second input of said NAND gate being connected to receive said input signal $y_{2j}$ through a third transfer gate and also to receive the same input signal $y_{2j}$ through a fourth transfer gate and a second inverter, said first to fourth transfer gates being controlled by said input $y_{2j+1}$ in such a manner that when said input signal $y_{2j+1}$ assumes the logic value "1", said first and third transfer gates are put in a signal blocking condition and said second and fourth transfer gates are put in a signal propagating condition;

a third inverter having an input connected to an output of said NAND gage and an output generating said output signal "2x";

a fourth inverter having an input connected to an output of said third inverter and an output generating said output signal "x";

a NOR gate having a pair of inputs connected to said first and second inputs of said first NAND gates, respectively;

a fifth inverter having an input connected to an output of said NOR gate;

a sixth inverter having an input connected to said output of said fifth inverter and an output generating said output signal "zero";

a second NAND gate having a first input connected to said output of said fifth inverter and a second input connected to receive said input signal $y_{2j+1}$ through a fifth transfer gate and also to receive the same input signal $y_{2j+1}$ through a tristate inverter, said fifth transfer gate and said tristate inverter being controlled by said mode signal in such a manner that when said mode signal has the logic level "0", said fifth transfer gate is put in a signal propagating condition and said tristate transfer gate is put in a high impedance, and when said mode signal has the logic level "1", said fifth transfer gate is put in a signal blocking condition and said tristate inverter operates as an inverter;

a seventh inverter having an input connected to an output of said second NAND gate and an output generating said output signal "minus"; and an eighth inverter having an input connected to an output of said seventh inverter and an output generating said output signal "plus".

* * * * *